L. W. CHUBB.
ELECTRICAL TRANSFORMING AND RECTIFYING SYSTEM.
APPLICATION FILED FEB. 10, 1916.
1,257,978.
Patented Mar. 5, 1918.
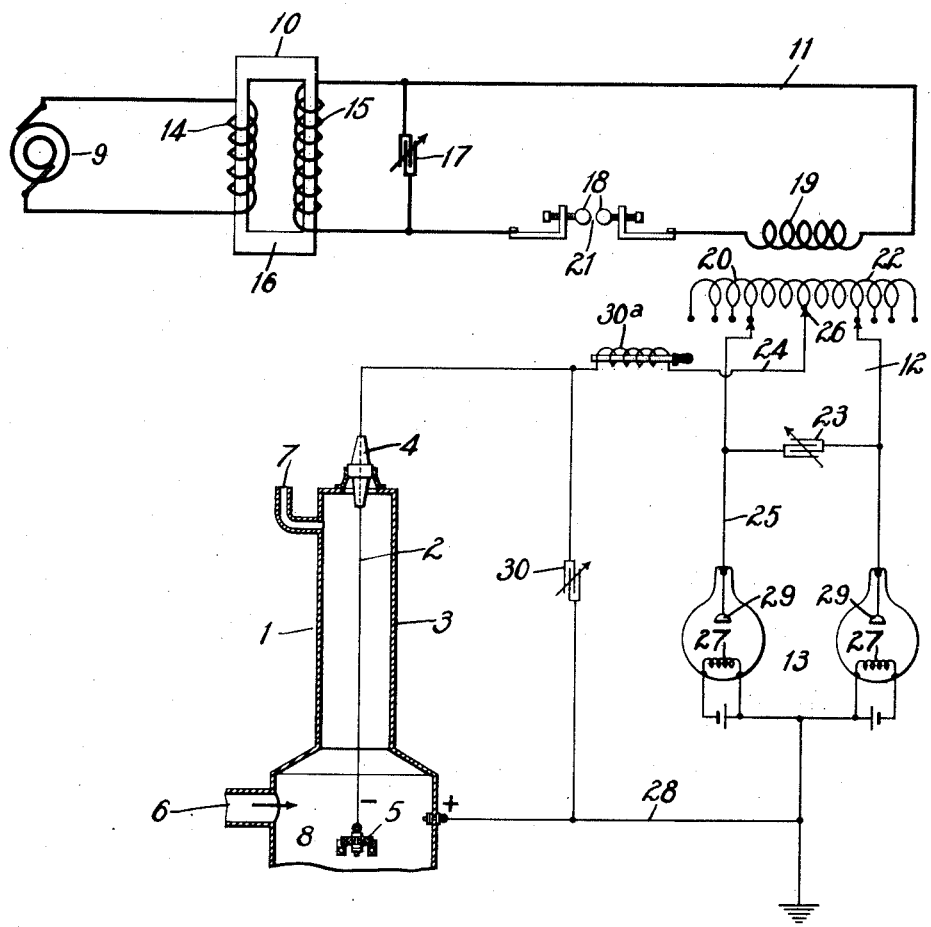
WITNESSES:
R. J. Fitzgerald.
Geo. W. Hansen.
INVENTOR
Lewis W. Chubb.
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL TRANSFORMING AND RECTIFYING SYSTEM.

1,257,978.  Specification of Letters Patent.  Patented Mar. 5, 1918.

Application filed February 10, 1916. Serial No. 77,416.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrical Transforming and Rectifying Systems, of which the following is a specification.

My invention relates to systems of electrical distribution and especially to means for transforming an alternating current of a relatively low potential and frequency into a high potential rectified or unidirectional current that may be employed for producing electrical discharges in one direction only.

More particularly, my invention refers to transforming means of the above-indicated character which may be employed in electrical systems operating at high voltages, such as obtain in the systems employed for precipitating finely divided particles of matter originally held in suspension in bodies of gas or vapor by the application of electric charges. Moreover, my transforming system may be utilized for exciting Röntgen-ray and similar tubes, and also for other service which may require the utilization of high-potential electrical discharges.

For the service conditions indicated, and, more especially, for separating suspended particles from gaseous bodies, it is desirable to operate at such voltages as will insure the formation of electrical discharges. To illustrate, the most effective method for precipitating electrically necessitates the production of silent electrical non-disruptive discharges or corona emanations. In accordance with the principles disclosed in United States Patent No. 1,067,974 to F. G. Cottrell, this method contemplates maintaining a non-disruptive discharge at maximum potential through the gaseous body to be precipitated, the negative potential being applied, preferably, at the surface from which the corona discharges emanate and being of such a value as to be in excess of that which may be maintained when the positive potential is applied to the said surface. Consequently, the discharge surface is maintained at a very high negative electrical potential in order to produce corona or silent electrical discharges in one direction only.

Inasmuch as it is difficult to accomplish the aforementioned result by applying a direct-current voltage of the requisite potential, the desired result has heretofore been obtained by employing an alternating-current, high-potential transformer in combination with a rectifier which, in practice, has been, almost without exception, a mechanical rectifier. The difficulties involved in subjecting mechanical rectifiers to service conditions involving such high-voltages are numerous and well known, and, as a substitute therefor, I propose to employ an asymmetric conductor or hot-cathode electron rectifier in combination with the attendant circuits to be disclosed in the following description.

In the system of the present invention, a source of power supply of relatively low frequency and low potential is employed in connection with a high-frequency discharge circuit which is magnetically interlinked with an auxiliary circuit embodying a hot-cathode rectifier or asymmetric conductor, the latter being utilized to rectify the high-potential, high-frequency alternating currents thus produced to effect corona discharges in one direction only from one of the electrodes of an electrical precipitating device. Again, the high-frequency circuit is resonated with the auxiliary circuit magnetically interlinked therewith, thereby producing a very efficient transformation or interchange of electrical energy. For the accomplishment of these ends, and for other objects which will be hereinafter pointed out, I have invented a transforming and rectifying system, the characteristics of which will be fully pointed out in the following description and the accompanying drawing in which the single figure is a diagrammatic view of an electrical precipitating system embodying a form of my invention.

In the figure, a smoke precipitator 1 is furnished with high-potential unidirectional current through the circuits 11 and 12, the former of which is supplied with high-potential alternating current through a transformer 10 and an alternator 9.

As mentioned above, the smoke-precipitating device shown at 1 utilizes high-potential voltages which will effect electrical discharges in one direction only. It is well known that negative-corona emanations are more effective in precipitating suspended particles than positive-corona emanations. In accordance therewith a central conductor 2 of the smoke precipitator is projected into the flue or stack 3 and insulated therefrom by means of an insulating bushing 4 and an insulating support 5. The centrally-disposed discharge electrode 2 is so connected in circuit that it is subject to negative potential at all times, and the smoke-stack 3 likewise is continually charged to a positive potential. The stack 3 is provided with an inlet 6 through which the gaseous body to be precipitated is admitted and with an outlet 7 through which the gaseous body, after having its suspended particles removed therefrom, is emitted. As mentioned above, the electrode 2 emits negative corona discharges which, in turn, impart electrical charges to the particles held in suspension in the gaseous body to be precipitated. The precipitated particles will deposit upon the walls of the smoke-stack 3 and will be collected in a chamber 8 provided at the bottom of the precipitator.

In order to produce negative-corona emanations from the discharge electrode 2, a source of power supply shown as a single-phase alternator 9, is connected through a transformer 10, a high-frequency circuit 11, and an auxiliary circuit 12, to a rectifier 13. The rectifier 13 is so connected to the smoke precipitator that negative potentials only will be impressed upon the discharge electrode 2.

The alternator 9 is connected to a primary winding 14 of the transformer 10, the secondary winding 15 thereof being magnetically interlinked with the primary winding 14 by means of the magnetizable core member 16. The secondary winding 15 is connected in shunt to an adjustable condensive reactance element 17 and the high-frequency discharge circuit 11, the latter comprising adjustable spark-gap members 18 and a primary winding 19 of an air-core transformer 20. The secondary transformer winding 15 is so designed that a sufficiently high potential may be impressed upon the condenser 17 to effect a spark discharge across the air gap 21 of the spark gap members 18. By properly adjusting the electrical constants of the transformer primary winding 19 and the condensive reactance 17, very high-frequency oscillations may be produced in the high-frequency circuit 11 when the spark gap 21 is disrupted, the condenser 17 and the inductive primary winding 19 being connected in series relationship to form a tuned or series resonant circuit. A secondary winding 22 of the air-core transformer 20 is placed in inductive relation with the primary winding 19. Another condensive reactance element 23 is connected in shunt to the secondary winding 22 and its electrical constants are so adjusted that the auxiliary circuit 12 will be in electrical resonance with the high-frequency discharge circuit 11 when oscillations are set up therein by reason of the spark discharges disrupting the air gap 21. In this manner, a very high-frequency and high-potential oscillation is produced in the auxiliary circuit 12 which is interconnected through a conductor 24 and adjustable leads 25 to the rectifier 13. The conductor 24 is connected to a mid-point tap 26 on the secondary transformer winding 22 and also to the discharge electrode 2. The cathode 27 of the rectifier 13 is connected, by means of a conductor 28, to the smoke stack 3. It will be apparent, therefore, that a complete circuit for the rectified current is established through the conducting space intermediate the discharge electrode 2 and the inclosing flue or smoke stack 3 of the smoke precipitator. It will be noted that the rectifier 13 is connected to the secondary 22 of the transformer 20 in the usual way, the two anodes 29 thereof being alternately charged as the high-frequency oscillation in the circuit 12 reverses its sign. The potential, therefore, existing between the electrodes 2 and 3 of the smoke precipitator 1 will be equal to one-half of the peak value of the voltage induced in the secondary winding 22, since the discharge electrode 2 is connected to the aforesaid mid-point tap on the transformer-secondary winding. In order to make the negative-corona emanations issuing from the discharge electrode 2 more steady, a condensive reactance element 30 is connected in shunt to the conductors 24 and 28 which is utilized to store the energy and regulate its subsequent discharge between the electrodes 2 and 3, and a reactance coil 30ª is inserted, as shown, to sustain the rectified current, as is well known in the art. The action of the condenser 30 may be considered as being similar to that of a fly-wheel associated with a motor-generator set whereby the peak loads are furnished with energy through the inertia of the fly-wheel and the device 30ª serves to maintain a constant flow of energy into the condenser.

It is known that the smoke precipitator 1 is subject to break downs when the conditions of the gaseous body flowing therethrough are considerably varied from normal. It is, consequently, important to protect the apparatus in circuit from the stresses or strains that may result from such a break-down. When a break-down occurs, the potential difference between the electrodes 2 and 3 will be substantially reduced, and the resonance of the auxiliary circuit 12 will be consequently disturbed because of the change in the electrical conditions obtaining in the circuits associated with, and supplied with power from, this auxiliary circuit. The tying-together of, or the resonance conditions existing between, the circuits 11 and 12 will be consequently disrupted, and small quantities of energy only will be transferred to the auxiliary circuit 12 because of said auxiliary circuit being forced out of step or out of resonance with the discharge circuit 11. The apparatus, therefore, will be protected against short circuits, such as may occur in the smoke precipitator 1, since the energy supplied to the rectifier 13 will be limited in amount and insufficient to maintain the break down conditions previously established in the precipitator.

From the foregoing description, it will be noted that no low-frequency, high-potential transformer is employed, such transformers being very expensive to construct and unreliable in operation because of the insulating difficulties involved. The transformer 20 which essentially is an equivalent of a Tesla-coil, being of an air-core type, is a relatively cheaper one to construct, and, by associating the transformer 20 with the high-frequency oscillation circuit 11, superior results may be obtained in effecting high-potential discharges. By associating the rectifier 13 with the secondary winding 22 and the high-frequency and high-potential auxiliary circuit 12, rectified currents of very high potentials may be obtained for operating the smoke precipitator 1.

While I have shown two hot-cathode electron rectifiers as comprising the rectifier or the asymmetric conductor for rectifying the alternating current, it will be understood that other asymmetric conductors may be suitably employed without departing from the spirit and scope of the appended claim.

I claim as my invention:

In a distributing system, the combination with a relatively low-potential and low-frequency alternating-current circuit, a high-frequency oscillating circuit, and means to effect a transformation of energy therebetween, of a second high-frequency high-potential circuit that comprises an asymmetric conductor magnetically interlinked with said first high-frequency oscillating circuit and tuned to resonate under normal conditions therewith, and a distributing circuit for the rectified currents delivered through said asymmetric conductor, said distributing circuit having a translating device that is subject to breakdowns when the resonant conditions normally obtaining between said high-frequency circuits are disturbed, whereby the energy supplied to said translating device may be limited to a safe value.

In testimony whereof, I have hereunto subscribed my name this 31st day of Jan. 1916.

LEWIS W. CHUBB.